United States Patent [19]

Rivet

[11] 4,124,124
[45] Nov. 7, 1978

[54] HYDRAULIC CONTROL AND DRIVE SYSTEM FOR AMPHIBIOUS VEHICLE HAVING A TOPSIDE DRAGLINE DRAW WORKS THEREON

[76] Inventor: Huey J. Rivet, 6901 River Rd., Waggaman, La. 70094

[21] Appl. No.: 798,461

[22] Filed: May 19, 1977

Related U.S. Application Data

[63] Continuation of Ser. No. 607,739, Aug. 25, 1975, abandoned.

[51] Int. Cl.² ............................................. B66C 23/84
[52] U.S. Cl. ....................................... 212/69; 115/1 R; 180/6.48
[58] Field of Search .................... 115/1 R, 63; 212/69, 212/66; 254/183, 139 R; 180/53 R, 6.48, 6.58, 66 R, 9.2 R; 305/24, 25

[56] References Cited

U.S. PATENT DOCUMENTS

| | | | |
|---|---|---|---|
| 2,590,787 | 3/1952 | Nickles | 212/69 |
| 3,369,672 | 2/1968 | Lorence | 212/69 |
| 3,645,349 | 2/1972 | Nichter | 180/6.48 |
| 3,739,652 | 6/1973 | Caldwell | 212/69 |
| 3,842,785 | 10/1974 | Rivet | 115/63 |
| 4,069,884 | 1/1978 | Morrow, Sr. et al. | 180/6.48 |

*Primary Examiner*—Trygve M. Blix
*Assistant Examiner*—Kenneth W. Noland
*Attorney, Agent, or Firm*—Wilkinson, Mawhinney & Theibault

[57] ABSTRACT

The present disclosure is directed to a hydraulic system for an endless track pontoon type amphibious vehicle having a dragline draw works mounted on the vehicle and both topside and undercarriage mechanism are operated hydraulically, the undercarriage works being driven through a hydraulic swivel valve mounted between the upper draw works and the amphibious undercarriage.

4 Claims, 9 Drawing Figures

HYDRAULIC CONTROL AND DRIVE SYSTEM FOR AMPHIBIOUS VEHICLE HAVING A TOPSIDE DRAGLINE DRAW WORKS THEREON

This application is a continuation of my previously filed application Ser. No. 607,739, filed Aug. 25, 1975, entitled Hydraulic Control and Drive System for Amphibious Vehicle Having a Topside Dragline Draw Works Thereon now abandoned.

An object of the present invention is to replace the direct drive and clutch drives of a conventional mechanically drive uppercarriage dragline draw works with a hydraulic drive system providing an infinite range of speed and torque control of the dragline draw works not heretofore attainable with direct mechanical connections when working with extra heavy loads on the dragline boom which must be rotated through 360° about the vehicle.

With the foregoing and other objects in view the invention will be more fully described hereinafter and more particularly pointed out in the appended claims.

In the drawings in which like parts are denoted by reference characters throughout the several views.

Figure 1:
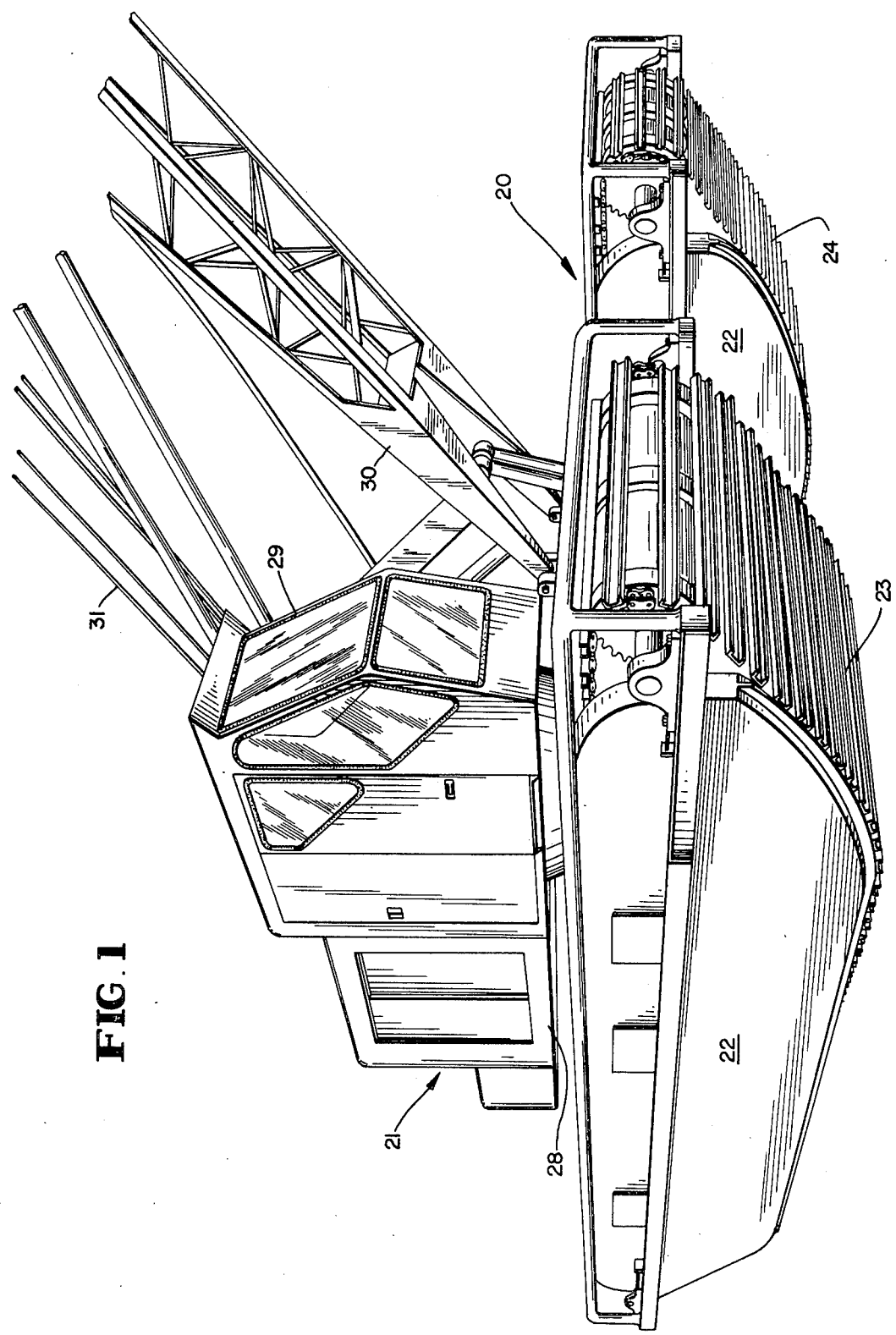
FIG. 1 is a front perspective view of an amphibious undercarriage of the type employed with the present invention having a dragline draw works constituting the uppercarriage thereon.
Figure 2:
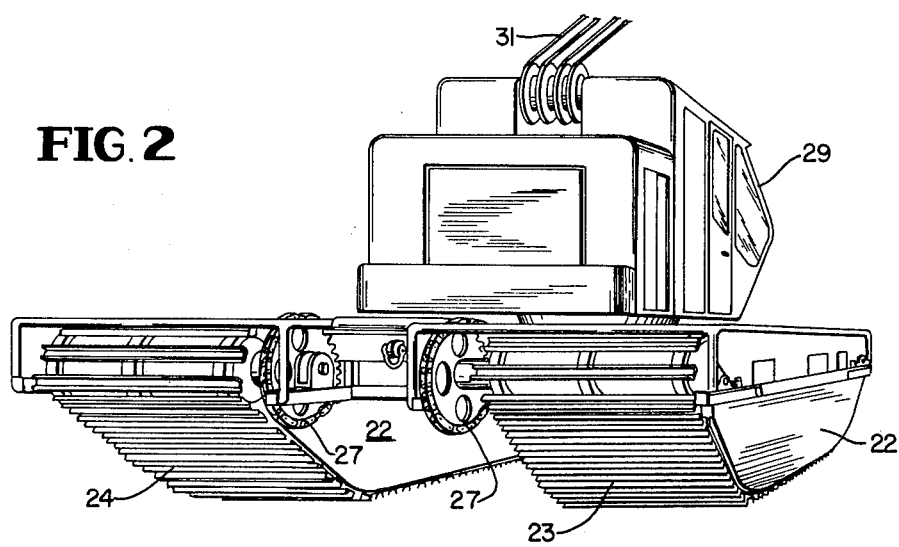
FIG. 2 is a rear perspective view of the apparatus of FIG. 1.

Referring now to FIG. 1 and 2, 20 designates an amphibious undercarriage vehicle of the type shown and described in my U.S. Pat. No. 3,842,785 upon which is pivotally mounted an uppercarriage 21 in the form of a dragline draw works of the Link-Belt Speeder type.

Figure 9:
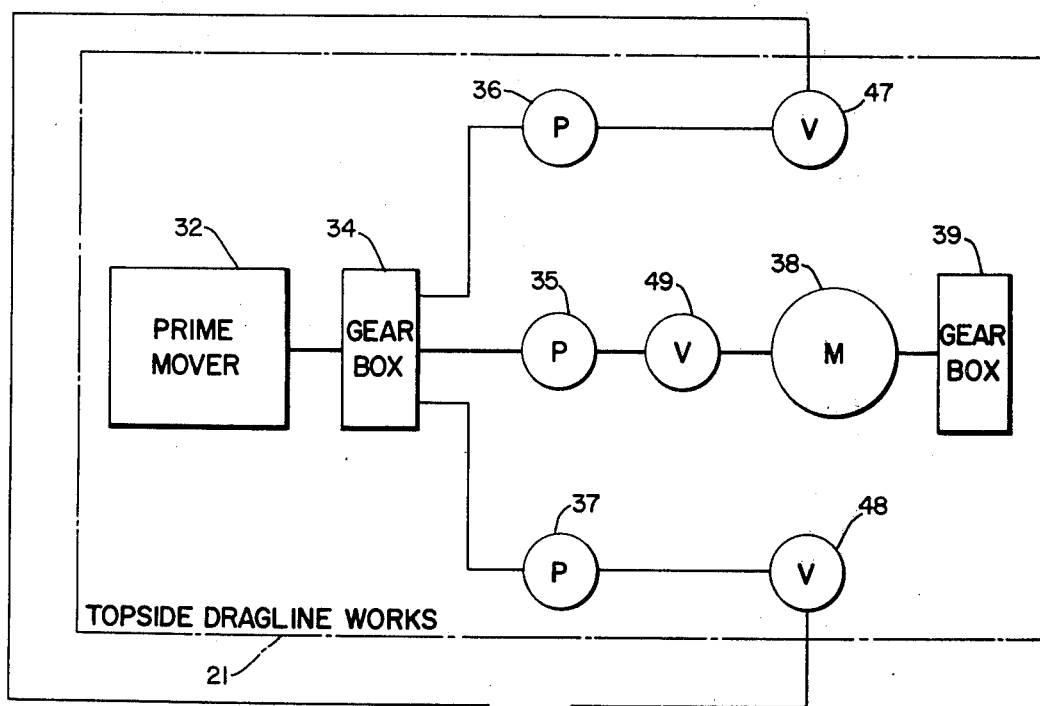
FIG. 9 is a hydraulic schematic of the undercarriage amphibious vehicle on which the top dragline works assembly is mounted showing the hydraulic drive system for the amphibious vehicle.
Figure 9:
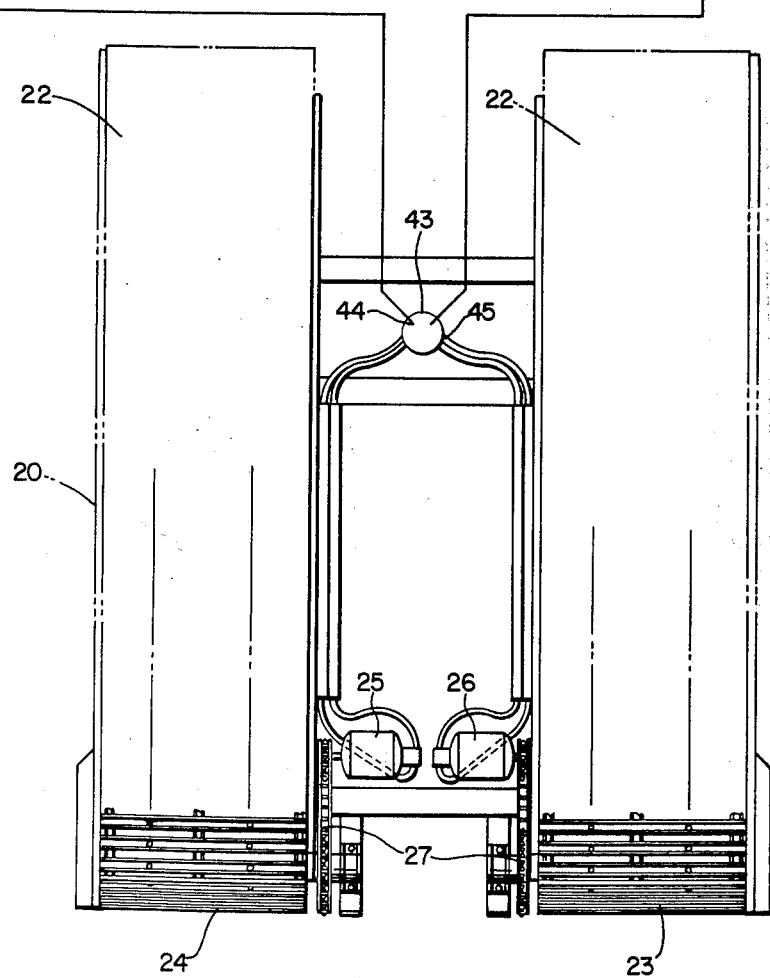

The undercarriage 20 comprises two pontoons 22 driven by endless tracks 23, 24 propelled by two separate hydraulic motors 25, 26, as best seen in FIG. 9, by a chain drive 27.

The uppercarriage has a platform 28 upon which is mounted an operator's cab 29 in which all controls for operating both the undercarriage 20 and the topside or uppercarriage dragline works 21 including the boom 30 and its cables 31.

Referring now to FIGS. 5 through 9 the hydraulic system of the present invention is shown in which mounted on the topside platform 28 is a prime mover 32 which may be either gasoline or diesel powered with a cooling system 33, which prime mover has its output shaft connected to drive a first gear box 34, which in turn drives three variable displacement pumps 35, 36 and 37.

The top pump 35 drives a hydraulic motor 38 which drives a second gear box 39 which through the conventional chain and sprocket drive operates the main jack shaft 40 of the dragline draw works, which from the drive of the jack shaft 40 driven by the second gear box 39 does not form a part of the present invention. The hydraulic pumps 36 and 37 drive the undercarriage propulsion motors 25, 26.

Figure 5:
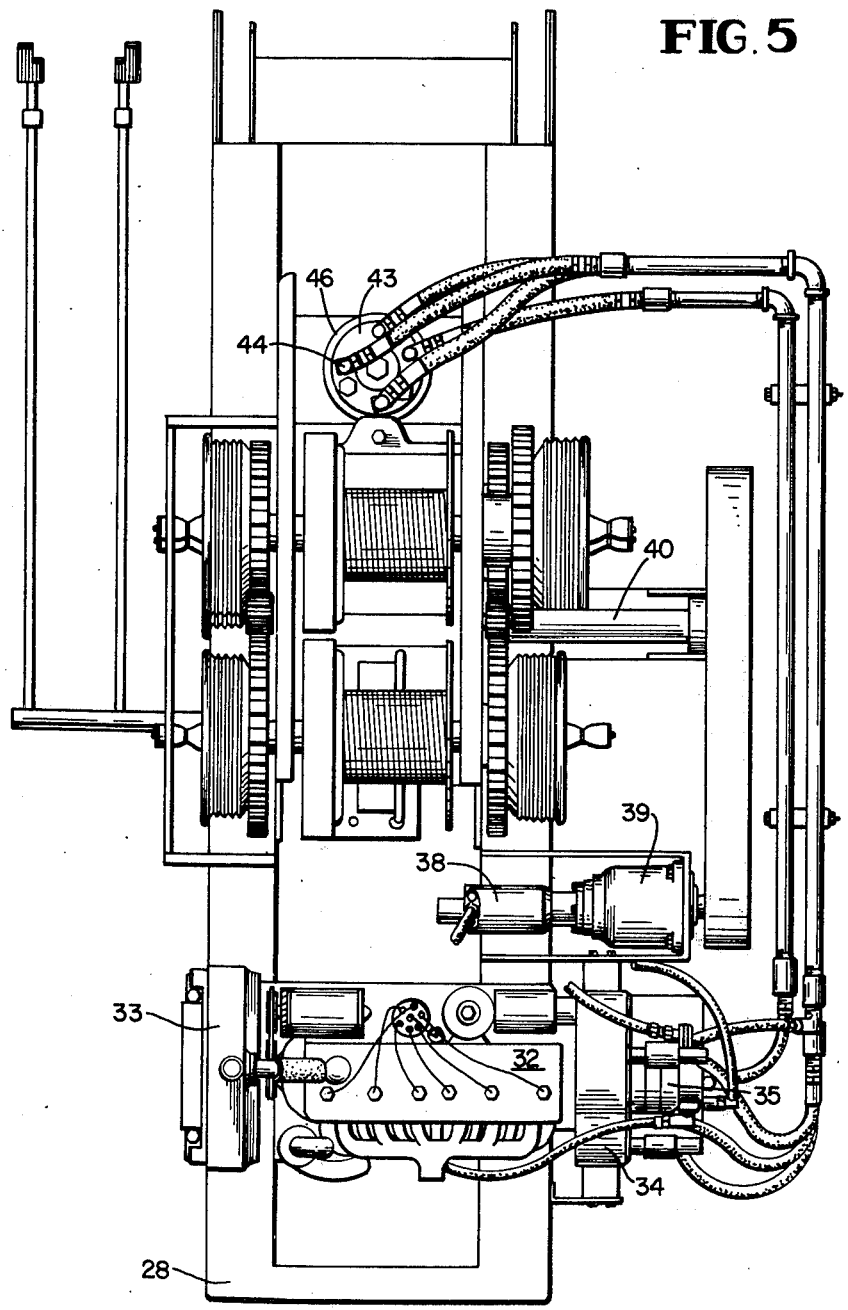
FIG. 5 is a top plan view of the prime mover and hydraulic system employed in the present invention as installed on the uppercarriage dragline draw works assembly.
Figure 6:
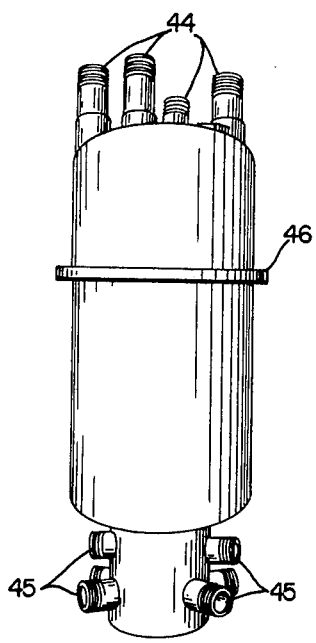
FIG. 6 is a perspective view of the swivel valve employed in accordance with the present hydraulic system.
Figure 7:
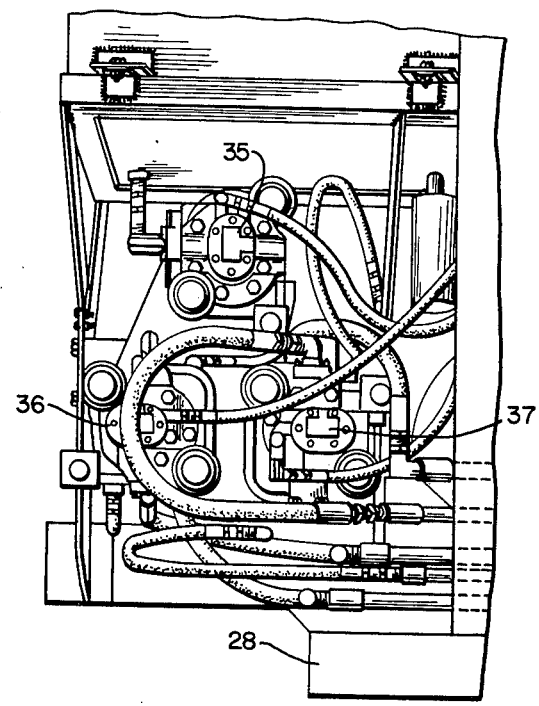
FIG. 7 is an elevational view of the dragline draw works assembly showing the gear box and hydraulic pumps and lines driven thereby.
Figure 8:
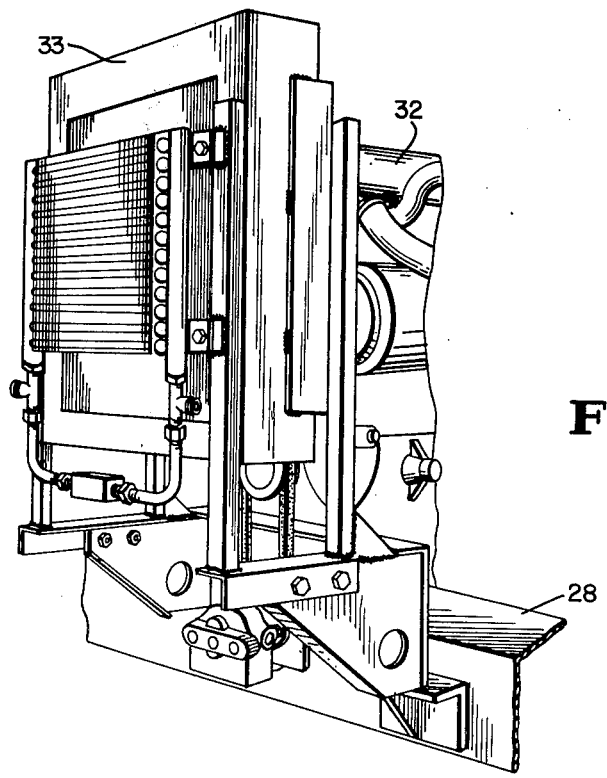
FIG. 8 is a rear end elevational view of the prime mover and hydraulic pump and cooling system employed with the dragline draw works top assembly.

To direct hydraulic fluid from the topside pumps 36, 37 to the propulsion motors 25, 26 fluids from each motor are piped by both flexible and rigid piping as shown in FIGS. 5 and 7 to a swivel valve assembly 43 having topside hydraulic connections 44 and bottom side connections 45. The swivel valve 43 has a flange 46 which is welded to the deck 28 of the dragline draw works as best seen in FIG. 5. The topside draw works 21 must be free to rotate 360° relative to undercarriage 20 so the swivel valve 43 is necessary to provide operating fluid to the undercarriage propulsion motors 25, 26.

Figure 3:
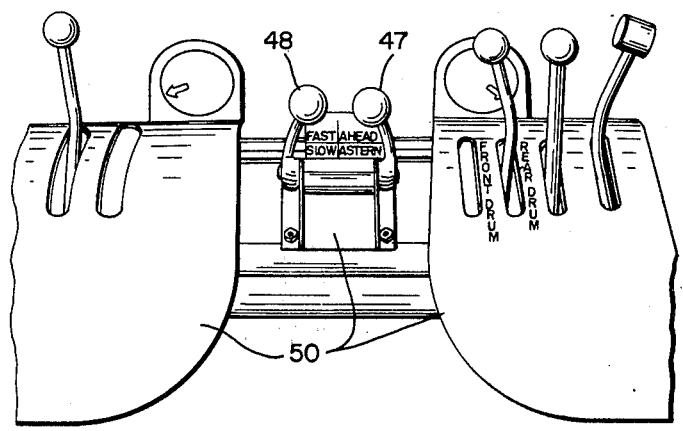
FIG. 3 is a front elevational view of the operator's control panel in the operator's cab of the dragline draw works.
Figure 4:
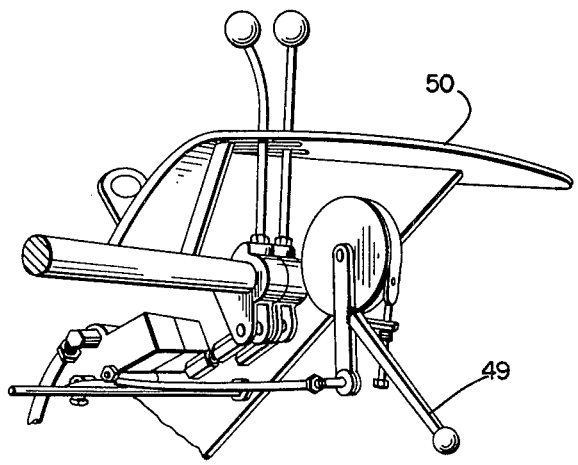
FIG. 4 is a perspective view of the operator's panel controlling the propulsion mechanism of the undercarriage amphibious vehicle with which the present invention is employed.

Variable pressure operator controlled operating valves 47 and 48 are in the hydraulic lines between the pumps 36, 37 and the undercarriage propulsion motors 25, 26. A variable pressure operating valve 49 controls the hydraulic pressure from pump 35 to hydraulic motor 38 which drives the second gear box 39 controlling the actuation and speed response of the uppercarriage dragline draw works 21. As best seen in FIGS. 3 and 4 all variable control valves are mounted on a panel 50 in the operator's cab 29.

The valves 47 and 48 are controlled by the operator to start, stop and turn the undercarriage 20, while valve 49 controls the speed response and lifting forces available to operate all of the uppercarriage or topside dragline draw works.

What I claim is:

1. For use with an amphibious undercarriage vehicle having a pair of parallel spaced pontoons about the lengths of which are mounted endless propulsion tracks each driven by a hydraulic motor, and a dragline draw works constituting an upper carriage pivotally mounted on the top of the undercarriage for 360° horizontal rotation relative to the undercarriage, said dragline draw works having a jackshaft a hydraulic drive system mounted on the upper carrige comprising:
    (a) a prime mover,
    (b) a first gear box driven by said prime mover,
    (c) a plurality of variable displacement pumps driven by said first gear box,
    (d) a hydraulic motor driven by one of said hydraulic pumps,
    (e) a second gear box driven by said hydraulic motor,
    (f) said second gear box being connected to drive the jackshaft of said dragline draw works,
    (g) a hydraulic swivel valve carried by said dragline draw works,
    (h) hydraulic connections means between said swivel valve and said hydraulic pumps, (i) hydraulic connecting means between said swivel valve and each hydraulic propulsion motor driving the endless tracks on each pontoon of the undercarriage, and
(j) operator controlled valve means for varying the hydraulic pressure delivered from said hydraulic pumps to the dragline draw works and to said propulsion motors.

2. A hydraulic drive system as claimed in claim 1 wherein there are three variable displacement pumps two of which have their outputs connected through the swivel valve to the endless track propulsion hydraulic drive motors for propelling and steering the undercarriage and the third of which drives the hydraulic motor connected to the second gear box.

3. A hydraulic drive system as claimed in claim 1, wherein the means for varying the hydraulic pressure delivered from said hydraulic pumps driven by said gear box are lever operated variable speed control valves mounted in the operator's cab of the uppercarriage dragline draw works.

4. For use with a vehicular undercarriage having a plurality of driven means, each means driven by a hydraulic propulsion motor, each said hydraulic propulsion motor being mounted upon said vehicular undercarriage and moveable therewith, and a dragline draw works constituting an upper carriage swivelly mounted on the top of the undercarriage for 360° horizontal rotation relative to the undercarriage, a hydraulic drive system mounted on the upper carriage comprising:
(a) a prime mover,
(b) a first gear box driven by said prime mover,
(c) a plurality of variable displacement pumps driven by said first gear box,
(d) a hydraulic motor driven by one of said hydraulic pumps,
(e) a second gear box driven by said hydraulic motor, said second gearbox controlling the actuation and speed response of said dragline draw works.
(f) a hydraulic swivel valve carried by said dragline draw works,
(g) hydraulic connection means between said swivel valve and said hydraulic pumps,
(h) hydraulic connecting means between said swivel valve and each hydraulic propulsion motor driving said driven means on said undercarriage, and
(i) operator controlled valve means for varying the hydraulic pressure delivered from said hydraulic pumps to the dragline draw works and to said propulsion motors.

* * * * *